Oct. 10, 1944.     F. L. KLAIBER ET AL     2,360,057

CONVEYER CHAIN

Filed March 18, 1942     2 Sheets-Sheet 1

INVENTORS.
Frank L. Klaiber
and Harlan C. Clark
By Parker, Rockwood & Farmer.
ATTORNEYS.

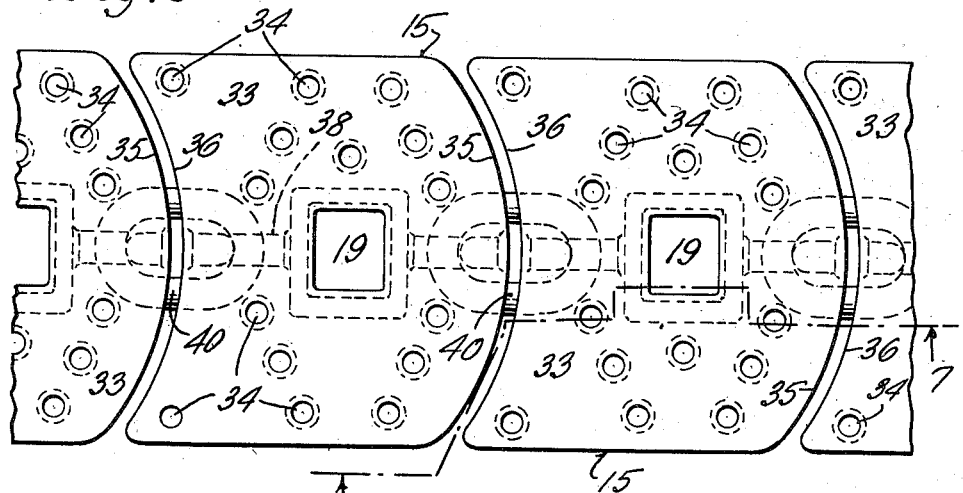
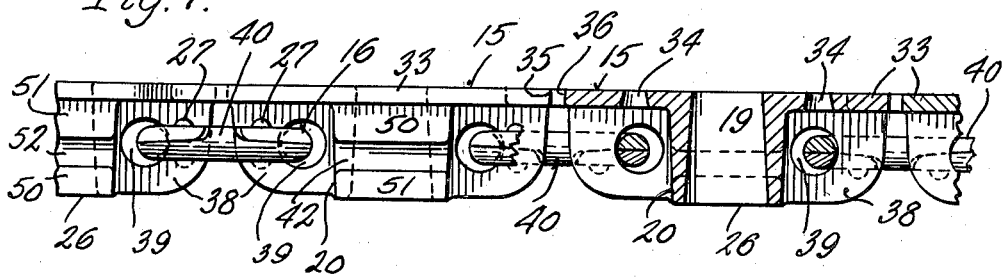
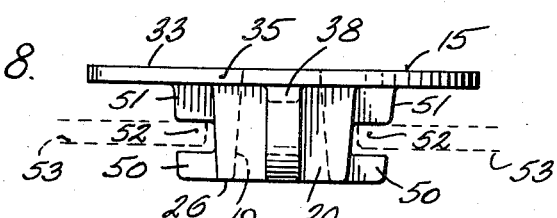
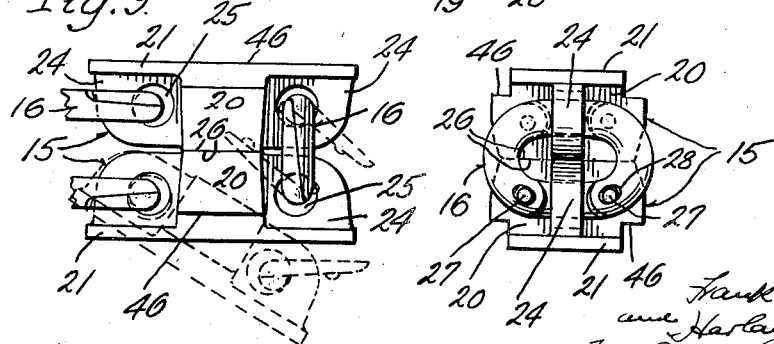

Patented Oct. 10, 1944

2,360,057

UNITED STATES PATENT OFFICE 2,360,057

CONVEYER CHAIN

Frank L. Klaiber, Buffalo, N. Y., and Harlan C. Clark, Columbus, Ohio, assignors to R. G. Wright Company, Inc., Buffalo, N. Y.

Application March 18, 1942, Serial No. 435,198

7 Claims. (Cl. 74—249)

This invention relates to improvements in chains and more particularly to improvements in conveyer chains.

One of the objects of this invention is to provide a conveyer chain of sturdy and simple construction, comprising alternate main links connected by loop links. A further object of this invention is to provide a chain of this type in which the main links are so formed that they can be easily produced in quantities and at low cost. Another object of this invention is to provide a chain which is so formed that it may be assembled, lengthened and shortened without the use of tools or implements. Another object is to provide a chain of this type in which alternate or connecting links between the main links of the chain are in the form of split or two-piece connecting links, and in which the main links are so formed that in all normal positions of the chain while in use the parts of the split links are held in correct relation to each other without securing the parts together. Another object is to provide a chain of this type in which the split loop links can be removed only when a main link of the chain is moved into a position approximately 180° from its normal position. Another object is to provide a chain in which a loop link may be placed into operative relation to or removed from the chain only if two main links are positioned with their bottom faces adjacent to each other and if the loop link is swung into a position crosswise of the length of the chain.

A further object of this invention is to provide a conveyer chain of this type with means of improved construction for cooperation with guide members to maintain the chain in its desired path of movement.

Other objects and advantages of this invention will appear from the following description and claims.

In the accompanying drawings:

Fig. 6 is a top plan view of a portion of a chain of modified construction.

Fig. 7 is a side elevation thereof, partly in section, on line 7—7, Fig. 6.

Fig. 8 is an end view of one of the links of the chain.

Fig. 9 is a side elevation of a portion of the chain showing two of the main links in such relation to each other as to permit removal of one of the connecting links.

Fig. 10 is an end view of the links shown in Fig. 9.

Figure 1:
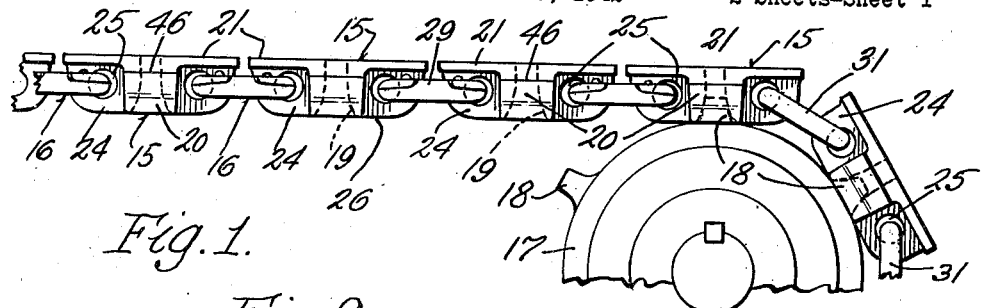
Fig. 1 is a side elevation of a portion of a conveyer chain embodying this invention, and of a sprocket wheel with which the chain cooperates.

Our improved chain includes main links 15 and a series of loop shaped connecting links 16. The main links are preferably all identical and each link is provided with means intermediate of the ends thereof for cooperation with driving and guide wheels. In Fig. 1, we have shown a sprocket wheel 17 having teeth 18 and the main links of the chain are provided in the middle portions thereof with means for mechanically cooperating with the wheels 17, such, for example, as apertures or sockets 19 formed to receive and cooperate with sprocket teeth 18. It will be understood, however, that any other cooperating connections between the wheels 17 and main links of the chain may be provided and the words "sprocket wheel" are hereinafter employed as designating any type of wheel adapted to cooperate with the chain for propelling or guiding it. In the particular construction shown, the apertures or sockets 19 are formed in bosses or body portions 20 of the main links, which extend downwardly from relatively flat upper webs or panels 21 of the links.

Figure 3:
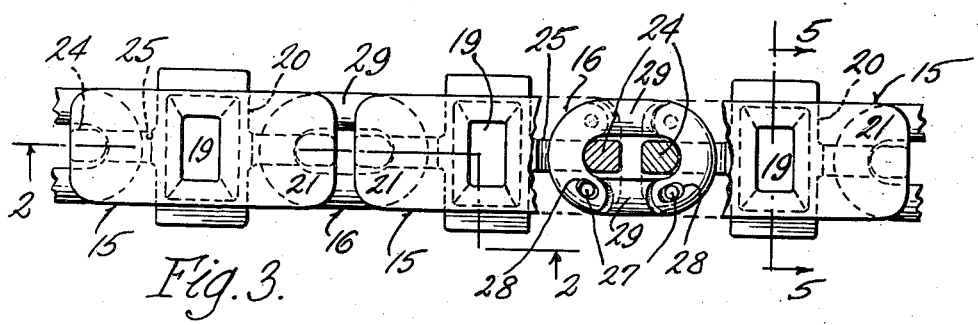
Fig. 3 is a top plan view thereof, partly in section, on line 3—3, Fig. 2.
Figure 4:
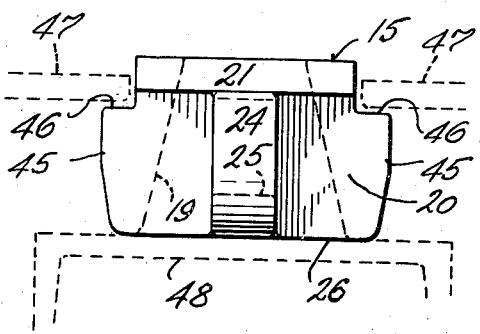
Fig. 4 is an end view, on a still larger scale, of one of the main links of the chain, showing the link in its operative relation to supporting and guide members for the chain.
Figure 5:
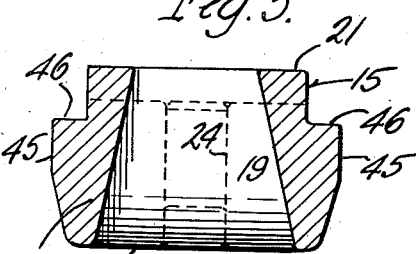
Fig. 5 is a transverse sectional elevation of the chain on line 5—5, Fig. 3.

The connections between the main links and the loops 16 are formed by providing the main links with longitudinally extending upright webs 24, which may be formed integral with bosses 20 of the chain and with the upper panels 21 of the links, thus forming a rigid unitary structure in which the webs 24 reinforce the bosses and the upper panels of the main links. Each web is provided with a transversely extending hole or aperture 25 which is somewhat larger in diameter than the cross sectional diameter of the metal of the looped connecting member or link 16 which extends into the aperture 25. The ends of the loop members or links are rounded or curved, as clearly shown in Fig. 3, and consequently, it will be obvious that the chain may be flexed not only in passing around a sprocket wheel as indicated in Fig. 1, but also sideways in either direction, since the loose fit of the looped connecting links in the holes 25 will permit the main links to swing laterally relatively to the loop links to any desired extent.

The loop links may be of any suitable or desired construction, most of those shown being of the type disclosed in the Thompson Patent No. 193,295 of July 17, 1877, in which each link is formed of two half links of approximately C shape, the two halves being identical in form and fitting together to form a link of approximately the same shape as a single piece loop link. Each half link may be provided with studs or projections 27 adapted to enter into holes or recesses 28 of the other half link, the oppositely disposed middle portions 29 of each link being solid or with the cross sectional circumference of the link left whole.

When the two parts of any of these split links are in their operative positions with relation to the main links of the chain, the two halves will be kept in operative relation to each other by means of the holes 25 in the main links, and consequently, it is unnecessary when these links are used to rivet over the studs 27 in order to prevent the two halves or parts of the links from becoming separated or disengaged from each other and from the main links.

Conveyer chains must ordinarily be readily adjustable as to their lengths so that each chain may properly cooperate with the particular conveyer on which it is used, and it frequently happens that after the conveyer has been in operation for some time, the chain becomes slack and it may be necessary to shorten it by removing one or more links. Our improved chain is so constructed that the lugs or projections 27 of the split links need not be riveted over, so that links may readily be removed from the chain, and we have further constructed our improved chain in such a manner that the split links will be held in their operative positions on the chain during all normal positions of the links relatively to each other. This is done by the location of the holes or apertures 25 in the webs 24 with relation to the ends of these webs and to their lower edges. The main links are so formed that the split links can only be removed from the adjacent main links if the split links are turned through approximately a right angle to the adjacent main links, or in other words, transversely of the length of the chain. Since the space within the split loop links is considerably longer than its width, the main links are so formed that during all normal positions of the chain, the split links cannot be turned into transverse positions, and hence cannot be removed from the chain.

Figure 2:
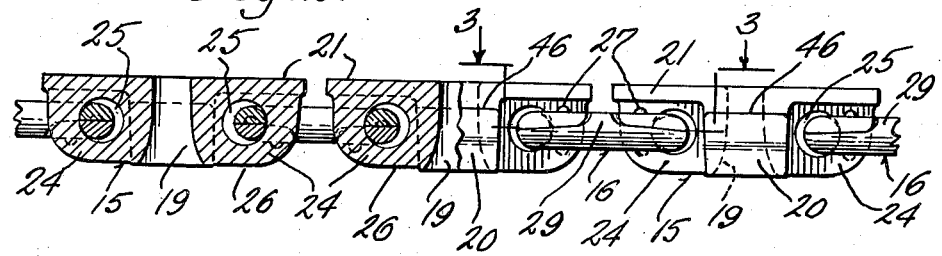
Fig. 2 is an elevation thereof, partly in section, on an enlarged scale, the section being approximately on line 2—2, Fig. 3.

It will be noted by reference to Fig. 2, of the drawings, that if two adjacent main links be moved toward each other in the direction of the length of the chain or at an angle of less than about 180° to each other, the loop link cannot be turned into a transverse position, due to the fact that the holes 25 are located at such distances from the ends of the webs 24 that the distance between these holes is greater than the transverse dimension of the space within the split link. However, in order to make it possible to position and remove the split loop links relatively to the main links, the holes 25 are located in much closer proximity to the lower edges 26 of the webs 24 than they are to the front and rear portions of these webs, so that if two adjacent links are swung relatively to each other so that their lower edges are substantially in contact as shown in Figs. 8 and 9, the loop link joining the two adjacent main links can be turned from its lengthwise position relatively to the chain into a transverse position, as shown in Figs. 9 and 10.

In order to assemble these split loop links on an adjacent pair of main links, it is necessary to first insert a half link into one hole 25 of one of the main links, and the other half link into the hole 25 of the other main link, and to turn the half links into transverse positions, so that the solid portions 29 of the half links are within the holes 25. The two adjacent main links 15 are then positioned relatively to each other so that the lower portions of these links are adjacent to each other or in contact, as shown in Figs. 9 and 10, whereupon the halves of the loop links may be swung from the broken line positions in Fig. 9 to the full line positions, thus assembling a loop link. The loop link is then turned from its transverse position into its normal or operative position in which it extends generally lengthwise of the main links. When in this position, the two halves of the link will be held in operative relation to each other by the portions of the webs 24 surrounding the holes 25, and the two main links can then be swung into normal relation to each other.

When it is desired to remove a loop link, it is merely necessary to swing two of the main links into the positions shown in Figs. 9 and 10, in which the lower portions thereof are adjacent or in contact, and then to swing the loop link through an angle of about 90° into a position transverse of its normal position, as shown in Fig. 10, whereupon the two halves of the loop link may be separated as shown in broken lines in Fig. 9, thus permitting the main links 15 to be separated with a half of each loop link connected therewith. When the main links are separated, the halves of the loop links may, of course, be easily moved out of the holes 25.

From the foregoing description, it will be apparent that after a chain has been assembled, a split loop link can only be removed if, in the first place, two adjacent main links are swung into the positions shown in Figs. 9 and 10, and if the loop link is then moved through an angle of about 90°. Consequently, even if two adjacent main links, while in use, assume the very abnormal positions shown in Figs. 9 and 10, the loop links could still not be removed from their connection with the main links unless the split loop links were also turned through an angle of 90°, so that the inadvertent separating of the parts of the chain during normal operation of the same is practically impossible. By means of this construction, a chain may readily and easily be assembled, lengthened, or shortened without the use of any tools or implements.

It is, of course, not necessary that all of the loop links be of the split or removable type. One piece loop chain links of ordinary construction, as indicated at 31 at the right hand side of Fig. 1, may be employed if desired, such links being usually made of bent steel rods, the opposite ends of which may, if desired, be welded together. It is desirable, however, that a plurality of the split two-piece loop links be employed to permit adjustment of the conveyer chain, and if desired, all of the loop links may be of the two-piece split type.

The upper faces of the main links may be of any suitable or desired form for use in connection with different types of conveyers, and if desired, the upper panels may be of enlarged size as shown at 33 in Figs. 6 to 8 to support bottles, cans, or other articles. These upper panels may be provided with any desired number of drain holes 34, and one end of each web may be of convex arc shape as indicated at 35 while the other end is of similar concave arc shape 36, so that the upper webs of the links may form a substantially continuous conveyer surface and may swing relatively to each other laterally in passing around an arc or curve.

The chain shown in Figs. 6 to 8 inclusive may otherwise be of the same construction as that shown in Figs. 1 to 5, being provided with forwardly and rearwardly extending webs 38 at opposite ends thereof provided with apertures 39 into which loop links 40 may extend, the apertures 39 being positioned relatively to the ends and bottoms of the webs 38, as described in connection with Figs. 1 to 5.

It is also possible to provide the main links with suitable means for guiding them on a conveyer. For example, the links shown in Figs. 1 to 5 are provided at the middle portions thereof with laterally projecting extensions 45, which may, if desired, be portions of the bosses 20, and the upper portions of these projections 45 may form shoulders 46 adapted to cooperate with a pair of guide plates or bars 47, Fig. 4, which may form a part of the conveyer with which our improved chain cooperates. In this case, the chain may operate upon a suitable support or platform 48.

In the construction shown in Figs. 6 to 8, spaced lateral lugs or projections 50 and 51 may be provided on each side of the central boss of each main link, the lugs 50 and 51 being spaced apart to form recesses or grooves 52 adapted to receive guide plates 53 of a conveyer, see Fig. 8. Any other means for guiding our improved chain on a conveyer may be employed, if desired.

By means of the construction described, the location of the holes or apertures in the upright webs prevents the turning of any split link into a position in which its largest dimension is transverse of the chain, except when two adjacent main links are arranged with their lower surfaces substantially in contact. The location of these apertures with reference to the ends of the webs is, however, also important in connection with one-piece links as shown at 31, in that the chain when in normal position will prevent the links from turning into transverse positions, and thus ensure them being maintained in their longitudinal positions in which they offer the greatest strength against breaking or deformation.

We claim as our invention:

1. A sprocket chain comprising a plurality of substantially identical main links having the middle portions thereof formed with sockets for cooperation with the teeth of a sprocket wheel and substantially flat upper load carrying portions integral therewith, upright webs extending forwardly and rearwardly from said middle portion and of materially less thickness than the width of said upper portions and formed integral with said middle portions and said upper portions and having apertures therein extending laterally through said webs adjacent to the ends thereof, and substantially identical loop-shaped split links extending loosely through adjacent apertures of a pair of main links and each comprising a pair of C-shaped parts disposed relatively to each other to form a closed loop, said upright webs, when in operative relation to each other, holding said parts against separation and permitting removal of said parts only when the two adjacent main links are swung through approximately 180° from their straight line positions.

2. A sprocket chain comprising a plurality of main links formed with sockets for cooperation with a sprocket wheel, upright webs on said links extending lengthwise thereof toward the ends of said main links and having apertures therein extending laterally through said webs, and elongated loop-shaped quickly detachable split links extending loosely through adjacent apertures of a pair of main links and formed of two complementary substantially C-shaped parts so constructed that when placed together, they form a closed loop, said apertures in said webs being spaced from the lower edges of said webs, so that the distance between said apertures of two adjacent main links when the same are swung into positions with their lower edges in contact is less than the transverse dimension of the space enclosed by said loop links, to permit said loop links to be swung into positions with their major dimension extending transversely of said main links to permit separation of the parts of said split links, the distance between said apertures and other edge portions of their webs being greater than said distance between said apertures and said lower edges to prevent swinging of said loop links into transverse positions when said main links are in other positions than with their lower edges substantially in contact.

3. A main link for a sprocket chain formed for cooperation with an elongated loop-shaped link, said main link comprising a central portion recessed to receive a sprocket tooth, webs integral with and extending from said central portion to the opposite ends of said link and having an aperture in each web for cooperation with other links, and pairs of spaced projections extending laterally from opposite sides of said central portion and below and spaced from the portion forming the upper surface of said main link and forming slots for cooperation with guide members of a conveyer, to hold said links against upward and downward motion relatively to the guide members.

4. A sprocket chain comprising a plurality of substantially identical main links each having a portion intermediate of the ends thereof constructed for cooperation with a sprocket wheel, webs extending forwardly and rearwardly from said intermediate portion and having apertures extending through said webs, and an elongated loop-shaped split link formed of two complementary C-shaped parts placed together in superposed relation and forming a closed loop, the superposed ends of said C-shaped parts extending through adjacent apertures of two adjacent links and held against separation from each other only by the edges of said apertures, said main links being so constructed that when swung with their bottom faces in contact, the split link can be moved with its major axis extending crosswise of the chain, to permit separation of the parts thereof.

5. A chain length comprising a plurality of links disposed approximately end to end, each main link having a generally flat load carrying face and a web at each end which is approximately normal to said face, each web having an aperture therethrough, an elongated, loop-shaped split link formed of two complementary C-shaped parts, the height of the C of each part being greater than its width and the gap in the C being greater across than the thickness of each of said webs, and said parts when placed together face to face, with the gap of each part embracing the part opposite the gap in the complementary part, forming a closed link, whereby when said parts of said split link are separated, each can be threaded through the aperture in a web of a main link until the web encircles the link part opposite the gap of that part, the parts then can be brought together face to face when said main links lie in positions of approximately 180° from their normal straight line positions, and turned as a unit through approximately a right angle to carry the ends of the split link into the apertures of webs of the main links through which the parts are threaded, said split link being removable from said main links only when said main links are again swung into said 180° positions and said split link is swung through approximately a right angle.

6. A sprocket chain comprising main links each having an aperture formed to cooperate with a sprocket wheel and having a web arranged substantially in the plane of the axis of said aperture and extending toward opposite ends of the link, said web having transverse apertures therein, and elongated readily detachable split links extending through apertures of adjacent main links and each formed of two C-shaped parts so constructed that, when placed together, they form a closed loop, said apertures in said webs being spaced from a longitudinal edge of said web a distance not more than half of the width of the opening in said split links and being spaced from the ends of said webs a distance greater than half of the width of said opening and less than half of the length of the opening in said split links, said main links when swung into a position with the longitudinal edges of the webs of adjacent links substantially in contact with each other, enabling said split links to be swung through approximately 90 degrees so that the openings in the C-shaped half links lie in registration with said web, to permit said halves of said split link to separate, the openings in said C-shaped half links being at least as great as the thickness of said web.

7. A chain assembly comprising a plurality of main links disposed approximately end to end and each having a body with an upper carrying face, an integral portion formed with a socket for driving cooperation with a tooth of a sprocket wheel, and a web adjacent each end having its faces generally parallel to each other, normal to said carrying face, and extending in the direction of the length of the link, each web having an aperture from face to face, and an auxiliary link connecting each pair of adjacent webs of adjacent main links, each auxiliary link having an elongated, closed loop body passing through said apertures in adjacent webs to form the connection between adjacent main links, the body of each auxiliary link being split in a direction generally lengthwise into two sections of vertically elongated superposed C sections having the gap in each C superimposed at the opposite, closed side of the C of the other section, said gap being of a length greater than the thickness of a web, whereby the closed side of the C of each section closes the gap in the C of the other section, said sections having complementary interlocking portions in their abutting faces limiting sliding of said sections on said faces, the length of the loop of each auxiliary link is such as to be held by the main links in approximately end to end relation when the major axis of the loop is lengthwise of the assembly, but with insufficient width to enable the loop to be turned crosswise of the assembly length when the main links are aligned end to end, the distances from the apertures of the webs to the lower edges of the webs being less than half the minor diameter of space within the loops of the auxiliary links, whereby when the main links are swung face to face, the auxiliary links can be tured to place the loops crosswise and enable separation of the sections and then separation of the main links connected thereby.

FRANK L. KLAIBER.
HARLAN C. CLARK.